United States Patent Office 3,343,440
Patented Sept. 26, 1967

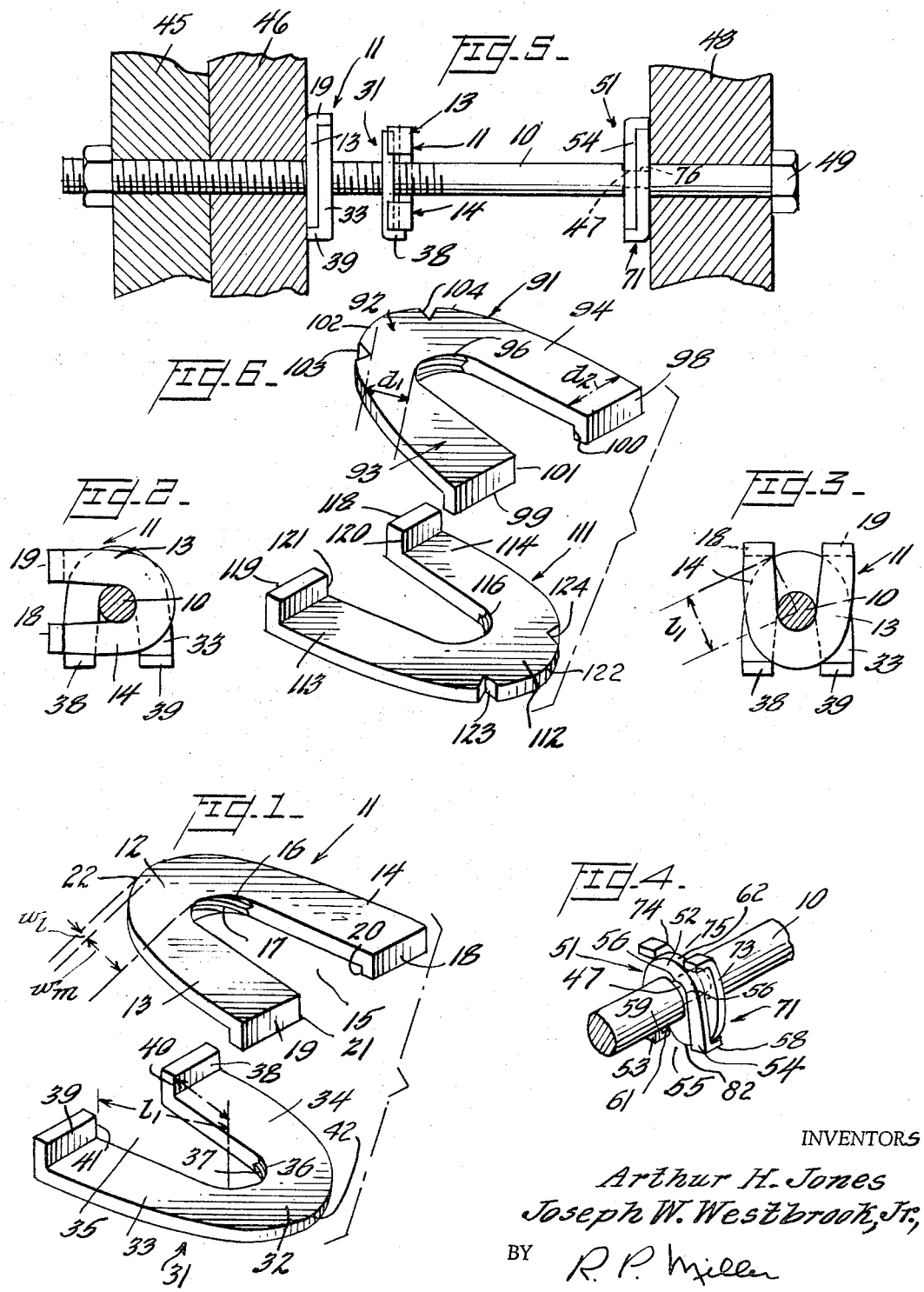

1

3,343,440
SELF-LOCKING TWO-PIECE FASTENING DEVICE
Arthur H. Jones, Winston-Salem, and Joseph W. Westbrook, Jr., Greensboro, N.C., assignors to Western Electric Company, Incorporated, New York, N.Y., a corporation of New York
Filed Oct. 18, 1965, Ser. No. 496,879
8 Claims. (Cl. 85—33)

ABSTRACT OF THE DISCLOSURE

A fastening device which may be assembled at any location along a rod includes a pair of U-shaped members, each formed with an enlarged lobe on an outer curved edge thereof, and with a pair of legs, each leg terminating in an upstanding tang. The members are placed adjacent each other on the rod, and then rotated relative to each other so that one tang of each member rides over, and locks against, the lobe of the other member.

---

This invention relates to a resilient fastening device, and more particularly to an improved resilient and lock type retaining and spacing split nut.

In many types of electrical and electronic equipment, threaded rods are utilized to support such items as circuit modules, switching frames, motors, support brackets, etc. In order to mount these units on the threaded rods, it is necessary to run nuts along substantial portions of the rods, or in modifying or repairing such equipment, it is necessary that the nuts be completely removed from, and later rethreaded on the rods. Currently, many types of resilient snap rings, washers, lock nuts, etc. are being used. Some have resilient securing parts which are readily assembled but which require special tools to disassemble. Others of these devices are generally either expensive or time consuming to install.

An object of the invention relates to a new and improved resilient two member fastening device.

Another object of this invention is to provide a new and improved fastening device that may be manually snapped on, locked, and then removed from any point on a long threaded rod without using special tools.

Another object of the invention resides in a pair of identical threaded members which may be mounted on and rotated relative to each other to clamp onto a screw threaded rod and then rotated and advanced along the rod as a unit.

An additional object of this invention is to provide a split nut comprising a pair of U-shaped members having threaded bights and depending tangs that may be removably mounted on a threaded shaft with the threaded bights engaging with the threaded shaft and with the tangs of each member acting against the other member to clamp the members together.

With these and other objects in view, the present invention contemplates a resilient fastening device for attachment to a screw threaded rod comprising a pair of U-shaped members having threaded bights and arms ending in angularly projecting resilient tangs. In use, a first member is placed about the screw threaded rod with the threads of the bight engaging the threads of the rod. A second member is placed at right angles to and abutting the first member so that the projecting tangs of each member overlie the adjacent member. The members are then rotated relative to each other whereupon a resilient tang on each member rides over a cam portion of an abutting member to lock the two members together to form a unitary fastening device. The assembled fastener may be then threaded along the rod to an adjusted position. To remove the fastener from the threaded rod, an operator need only rotate the members relative to one another.

2

Other objects and advantages of the present invention will be apparent from the following detailed description when considered in conjunction with the accompanying drawings wherein:

FIG. 1 is a perspective view, showing the two cooperating nut sections, generally U-shaped, with threaded bights formed on the inner curved surface and resilient tangs upstanding from the outer edge of each leg;

FIG. 2 is a top view showing a pair of slip-on sections of the split nut positioned on the bolt prior to rotation into a locked position;

FIG. 3 is a view similar to FIG. 2 showing the cooperating sections of the split nut after being rotated substantially a quarter turn into the locked position;

FIG. 4 is a perspective view showing, as a second embodiment, a pair of slip-on sections having unthreaded bights positioned on a necked down portion of a bolt;

FIG. 5 is an elevational view partially in section of a bolt having fixed heads mounted in supports, together with a showing of a split nut locking device embodying the principles of the present invention; and FIG. 6 is a perspective view, showing the two cooperating nut sections of either embodiment with V-shaped notches formed in the rise of the curved lobe portions to provide for a more secure locking arrangement.

Referring first to FIG. 1 of the drawings, there are shown two identical fastener or nut U-shaped members 11 and 31 fabricated from blanks of a general disc-shaped configuration. Each member 11 or 31 has a curved portion 12 or 32 (corresponding numeral 32 in duplicate member 31) and legs 13 and 14 or 33 and 34. The legs subtend a slot 15 or 35 extending to the center of the member. The bottom of the slot 15 or 35 forms a bight 16 or 36 which may be provided with threads 17 or 37. The width of each slot may be equal to or slightly greater than the outside diameter of the threads 17 in the bight 16. Resilient tangs 18 and 19 or 38 and 39 are integrally formed on the legs 13 and 14 or 33 and 34 and project angularly from the free ends of the legs. The curved portion 12 or 32, which is formed with an enlarged or lobe portion 22 or 42 (shown by dimension $w_1$ in FIG. 1), is joined to the legs 13 and 14 or 33 and 34 with a portion which is the same width as the legs (shown by dimension $w_m$ in FIG. 1). The length $l_1$ from the center of curvature of the bight 12 to the inside corner 21 or 20 of the tang 19 or 18 is less than the root radius of the threads 17 plus the width $w_1$ of the lobe 22 plus the width $w_m$ of the member at a point opposite to the bottom of the bight.

In utilizing these fastener members as a resilient locking device, the first member 11 is placed about a threaded rod 10 (see FIG. 5) with the threads 17 in the bight 16 engaging the threads of the rod 10. The second member 31 is then placed at right angles to the first member 11 and spaced a slight distance from the first member so the dependent tangs 38 and 39 of the second member will overlie the adjacent leg section 14 of the first member as shown in FIG. 2. The members are then rotated relative to each other 90 degrees whereupon the first member 11 advances along the threaded rod 10 toward the second member 31 with the resilient tang 19 of one leg 13 of the first member being flexed and riding over the lobe portion 42 of the second member. Meanwhile, the second member 31 advances along the threaded rod 10 toward the first member 11 with the resilient tang 39 of one leg 33 of the second member being flexed and riding over the lobe portion 22 of the first member.

The body section of the first member 11 is now in contact with the body section of the second member 31 (see FIG. 5) and as illustrated in FIG. 3, the tangs 18 and 19 on member 11 engage, and are thus locked against, the lobe 42 of the body section of the adjacent member 31. Similarly, the tangs 38 and 39 on member 31 engage and are thus locked against the lobe 22 of the body section of the adjacent member 11. The resilient locking device may now be rotated as a unit and threadably advanced along the threaded rod 10 to engage a support 45 for a bracket or frame 46 as shown, for example, in the left-hand portion of FIG. 5.

Disassembly of the resilient fastening device may be accomplished by first threadably advancing the device along the rod 10 away from and out of contact with the bracket or frame 46. The two members are then rotated a quarter of a turn with respect to each other whereupon the first member 11 is moved away from the second member 31 along the threaded rod 10 with the tang 19 on one leg 13 of the first member flexing and riding over the lobe portion 42 of the second member 31. The second member 31 is simultaneously moved away from the first member with the tang 39 on one leg 33 of the second member 31 riding over the lobe portion 22 of the first member 11. The two members may then be slidably removed from the threaded rod 10.

In another embodiment, the threaded rod 10 may be provided with a necked down portion 47 (see FIGS. 4 and 5) located adjacent the outer face of a bracket or frame 48 which is to be supported by two identical fastener members 51 and 71. Each member 51 or 71 has a curved portion 52 or 72 and legs 53 and 54 or 73 and 74. The legs 53 and 54 subtend a slot 55 or 75 that extends to the center of the member with the bottom of the slot 55 or 75 forming an unthreaded bight 56 or 76. The width of each slot 55 or 75 may be equal to or slightly greater than the outside diameter of the necked-down portion 47 of the rod 10. The curved portion 52 or 72 which is formed with an enlarged or lobe portion 62 or 82 is joined to the legs 53 and 54 or 73 and 74 with a portion which is the same width as the legs. The length $l_1$ from the center of curvature of the bight 56 to the inside corner 61 or 60 of the tang 59 or 58 is less than the radius of the necked-down portion 47 of the rod 10 plus the width $w_1$ of the lobe 62 plus the width of the member 51 $w_m$ at a point opposite to the bottom of the bight 56. The two members are then mounted on the rod 10 in the necked-down portion 47 (see FIGS. 4 and 5) in the manner hereinbefore described to lock the bracket or frame 48 against a head 49 of the rod 10.

Both the aforedescribed embodiments may be modified to provide a more secure locking of the members by utilizing two identical fastener or nut members 91 and 111 each having V-shaped notches 103 and 104 or 123 and 124 in the rise of a lobed portion 102 or 122 near the intersection of the lobe with the outer periphery of a curved body portion 92 or 112 of the member 91 or 111. The notches 103 and 104 or 123 and 124 are cut so that a distance $d_1$ from the bottom of each notch 103 and 104 or 123 and 124 to a bight 96 or 116 is greater than a width $d_2$ of legs 93 and 94 or 113 and 114. The notches 103 and 104 or 123 and 124 are so spaced that when the two members 91 and 111 are rotated with respect to each other, a tang 99 of the first member 91 will flex and ride over the curved outer periphery of the lobe 122 of the second member 111 with an edge 101 of the tang 99 snapping into the notch 123 and an edge 100 of the tang 98 snapping into the notch 124 of the second member 111. Simultaneously, edges 120 and 121 of the tangs 118 and 119 of the second member 111 will engage the notches 104 and 103 of the first member whereupon the two members are locked together about the rod 10.

It is to be understood that the above-described embodiments are simply illustrative of the principles of the invention. Numerous other modifications may be devised without departing from the spirit and scope of the invention.

What is claimed is:
1. A self-locking two-piece fastening device for attachment in abutting relation at any selected position on a rod comprising:

a pair of identical members each member symmetrical about an axis provided with an open ended slot extending from the outer periphery of said member and terminating in an inner curved bight, each of said members having a lobe formed on the outer periphery thereof and opposite the inner curved bight, said lobe having a width which gradually increases from subtended opposed portions of said bight and having a maximum width opposite the center of the bight, and resilient means upstanding from the peripheral edge of said member on each side of said slot for engaging the lobe of the other member to lock said identical members against said rod.

2. A fastening device comprising:
a pair of identical disc-shaped members that may be transversely slipped onto a screw threaded shaft in abutting relation about said shaft, each of said members having a curved portion having inner and outer curved edges with a threaded bight formed on the inner edge, said curved portion having a lobe formed on the outer curved edge thereof, said lobe having oppositely extending, increasing widths subtending said bight that join at a maximum width which is opposite to the center of said bight, each of said members having parallel arms extending from each end of the curved portion, each of said arms terminating in upstanding resilient means to engage and overhang the lobe of the adjacent member and lock said disc-shaped members against the shaft.

3. A self-locking, two member, fastening device comprising:
a pair of identical generally U-shaped members, each of said members having a bight formed on the curved inner edge and a lobe formed on a curved outer edge and a pair of spaced notches formed on the curved outer edge, said lobe having a width which gradually increases from subtended opposed portions of said bight in the vicinity of said notches and having a maximum width opposite the center of the bight, and a pair of upstanding resilient tangs integrally formed on the free ends of the legs of each U-shaped member and spaced apart a distance equal to the distance between one pair of notches, said tangs on each member overlying one of the legs of the other member when the two members are transversely mounted in superposed relationship at right angles to one another on a rod, so that upon rotation of the two members, a quarter of a turn with respect to each other, one resilient tang of each member deforms, rides over the curved outer edge and lobe and locks in against one of the notches in the outer curved portion of the superposed member, whereupon the other tang of each member locks in the other notch of the other member, the two members thereafter cooperating to form a unitary fastener.

4. A two member fastening device comprising:
a pair of identical, generally U-shaped members,
said U-shaped members having an arcuately threaded bight formed on the curved inner edge of each member,
said U-shaped members having a pair of spaced V-shaped notches formed on the lobe of each member,
a lobe formed on the outer curved edge and opposite the bight of each member, said lobe having a width which gradually increases from subtended opposed portions of said bight in the vicinity of said notches and having a maximum width opposite the center of the bight, and
a resilient tang laterally projecting from the free end of each leg of each of said U-shaped members, said tangs on each member overlying one of the legs of the other member when the two members are transversely mounted in superimposed relationship at right angles to one another on a rod, so that upon rotation of the two members a quarter of a turn with respect to each other, one resilient tang of each member deforms, rides over, and locks within one of the notches in the outer curved portion of the other superimposed member whereupon the other tang of each member locks in the other notch of the other member, the two members thereafter cooperating to form a unitary fastening device with a threaded opening which may be moved to any position along the threaded rod.

5. A split nut for attachment to a threaded shaft comprising:
 a pair of identical U-shaped members mounted in abutting relation about said shaft,
 each of said members having a bight and a screw thread formed in the bottom of said bight to engage said threaded shaft,
 each member having arms extending about said bight terminating in perpendicular projecting tangs, and
 a lobe formed opposite the bight on each member for engaging said projecting tangs to lock said U-shaped members about said shaft,
 said lobe having a width which gradually increases from subtended opposed portions of said bight and having a maximum width opposite the center of the bight.

6. A split nut for attachment to a threaded shaft,
 a first member having a slot extending from the periphery toward the center of said member, said member having screw threads formed at the bottom of said slot for engagement with said threaded shaft,
 a lobe formed on the periphery of said member opposite to said slot,
 said lobe having oppositely extending, increasing widths subtending the bottom of said slot that join at a maximum width which is opposite to the center of the bottom of said slot,
 a pair of resilient tangs extending from said member at the periphery thereof and at opposite sides of said slot, and
 a second member identical to said first member and positioned on said first member for relative movement with said first member about said shaft to move one tang on each member over the lobe on the other member to lock said members together about said shaft.

7. A fastening device for attachment to a shaft comprising:
 a pair of identical generally U-shaped members mounted in abutting relation about said shaft, each of said members having a pair of parallel arms forming a slot between the arms,
 each of said members having a curved bight at the inner terminus of said slot,
 a lobe formed to extend along the outer periphery of the curved portion, said lobe having a variable width with the maximum width of the lobe being along a line which is parallel to the arms and which intersects the center of curvature of the bight, and
 an intergal, resilient tang upstanding from the free end of each of said arms, each of said tangs being formed with an inner corner adjacent the slot at a distance from the center of curvature of the bight which is less than the raduis of the bight plus the maximum width of the lobe plus the width of the member at a point opposite to the bottom of the bight.

8. A fastening device for attachment to a shaft as defined in claim 7 wherein each of said members have screw threads formed at the inner terminus of the slot.

References Cited

UNITED STATES PATENTS

| | | | |
|---|---|---|---|
| 665,274 | 1/1901 | Seaman | 85—33 |
| 2,355,679 | 8/1944 | Roxs et al. | 85—33 |
| 2,999,412 | 9/1961 | Martens | 85—8.8 |

FOREIGN PATENTS

| | | |
|---|---|---|
| 820,658 | 11/1951 | Germany. |
| 125,335 | 6/1949 | Sweden. |

CARL W. TOMLIN, *Primary Examiner.*

M. PARSONS, JR., *Assistant Examiner.*

UNITED STATES PATENT OFFICE
CERTIFICATE OF CORRECTION

Patent No. 3,343,440                                              September 26, 1967

Arthur H. Jones et al.

It is certified that error appears in the above identified patent and that said Letters Patent are hereby corrected as shown below:

In the heading to the sheet of drawings, line 2, "SELF-LACKING should read -- SELF-LOCKING --. Column 1, line 22, "resilient" should read -- self-locking two-piece --; line 23, cancel "and"; line 30, "modiyfing" should read -- modifying --; line 39, cancel "resilient"; same line 39, after "member" insert -- resilient --; line 57, "resilient" should read -- self-locking two-piece --. Column 2, lines 41 and 47, "$w_1$", each occurrence, should read -- $w_\ell$ --; line 49, "resilient" should read -- self-locking two-piece --. Column 3, line 2, "resilient" should read -- self- --; line 7, cancel "resilient"; line 38, "$w_1$" should read -- $w_\ell$ --. Column 5, lines 25 to 28, indicated as the last element, should be a continuation of the last element; lines 36 to 39, indicated as a new element, should be a continuation of the second element.

Signed and sealed this 18th day of November 1969.

(SEAL)
Attest:

EDWARD M. FLETCHER, JR.                            WILLIAM E. SCHUYLER, JR.
Attesting Officer                                      Commissioner of Patents